(12) United States Patent
Goto

(10) Patent No.: US 6,449,102 B1
(45) Date of Patent: Sep. 10, 2002

(54) ZOOM LENS DEVICE ADAPTED TO MACRO PHOTOGRAPHY

(75) Inventor: Tadashi Goto, Yokohama (JP)

(73) Assignee: Goko International Corporation (JP)

( * ) Notice: Subject to any disclaimer, the term of this patent is extended or adjusted under 35 U.S.C. 154(b) by 31 days.

(21) Appl. No.: 09/593,320

(22) Filed: Jun. 13, 2000

(30) Foreign Application Priority Data

| Nov. 11, 1999 | (JP) | ............................................ 11-321454 |
| Nov. 19, 1999 | (JP) | ............................................ 11-330442 |
| Jan. 24, 2000 | (JP) | ........................................ 2000-014385 |
| Feb. 8, 2000 | (JP) | ........................................ 2000-029861 |

(51) Int. Cl.[7] ............................................. G02B 15/22
(52) U.S. Cl. ...................................... 359/693; 359/705
(58) Field of Search ................................ 359/693, 705, 359/691–692, 689, 686, 685, 683, 676, 699–700

(56) References Cited

U.S. PATENT DOCUMENTS

| 3,773,402 A | * | 11/1973 | Gela et al. ................... 359/693 |
| 4,298,251 A | * | 11/1981 | Hartmann .................... 359/693 |
| 4,322,150 A | * | 3/1982 | Kamata et al. .............. 359/705 |
| 4,439,018 A | * | 3/1984 | Okajima et al. ............. 359/705 |
| 4,576,444 A | * | 3/1986 | Kawamura ................... 359/693 |
| 4,711,534 A | * | 12/1987 | Matsushita et al. ......... 359/680 |
| 5,960,217 A | | 9/1999 | Goto ............................ 396/65 |
| 6,222,681 B1 | * | 4/2001 | Matsumoto et al. ........ 359/693 |

* cited by examiner

Primary Examiner—Jordan M. Schwartz

(57) ABSTRACT

In a zoom lens device, the mechanism for guiding lens groups for achieving a composite focal length for the zoom lens function is used also for positioning the lens groups for the macro lens function. In particular, the position for the macro lens function is defined in a region near the wide end of the zoom lens function so that the interference with the convenience of the zoom lens function may be minimized. The mechanism for the zoom lens function can be thereby used additionally for the macro lens function so that the mechanism for achieving the two functions can be simplified, and the manufacturing cost can be minimized. This device is suitable for use in compact cameras.

10 Claims, 11 Drawing Sheets

ZOOM LENS DEVICE ADAPTED TO MACRO PHOTOGRAPHY

TECHNICAL FIELD

The present invention relates to a zoom lens device which is adapted for macro functions, and in particular to a zoom lens device for inexpensive zoom lens cameras which is also adapted for macro photography.

BACKGROUND OF THE INVENTION

Conventionally, a camera, in particular a compact camera, is typically capable of taking clear picture shots only when the object is at least approximately one meter away. Some of the cameras are equipped with a macro mode which allows a clear picture to be taken even when the object is as close as 60 cm away. However, the pictures which can be obtained by these cameras are often unsatisfactory because the surrounding objects which are located in front and behind the central objects cannot be properly focused. In particular, when the object has a three-dimensional shape, and has a depth, it is not possible to achieve a favorable focusing over the entire object. Furthermore, it has not been possible with the exception of certain specialized cameras to take a clear picture of an object which is at an extremely close range, for instance in the distance range of 10 to 30 cm.

In U.S. Pat. No. 5,960,217 issued to T. Goto on Dec. 28, 1999, the inventor previously proposed a compact camera which can take clear pictures of objects not only in normal distance ranges but also of objects in extremely close ranges. The contents of this prior patent are incorporated in this application by reference.

The zoom lens function used to be available only in high grade cameras, but has since been introduced into less expensive compact cameras in an increasing number. It is widely appreciated that the zoom lens function provides a great photographic versatility to the camera. A zoom lens mechanism typically includes a front lens group and a rear lens group which are placed along an optical center line, and are required to be moved at a prescribed positional relationship so as to vary the composite focal distance while maintaining a proper focusing at the same time.

Combining the macro function with the zoom lens function can even more enhance the versatility of the camera, and expands the photographic freedom of the camera. However, the camera gets highly complex even with the macro lens function alone, and adding the macro lens capability to the camera significantly adds to the complexity of the camera. For this reason, hitherto, it has not been possible to combine both a macro function and a zoom lens function in a compact camera.

Also, it is desired that the camera remains to be easy to use when these functions are incorporated in the camera.

BRIEF SUMMARY OF THE INVENTION

In view of such problems of the prior art, a primary object of the present invention is to provide a zoom lens device which additionally incorporates a macro function with a minimum addition of complexity.

A second object of the present invention is to provide a zoom lens device which additionally incorporates a macro function at a minimum cost.

A third object of the present invention is to provide a zoom lens device which additionally incorporates a macro function without substantially complicating the mode of operation.

A fourth object of the present invention is to provide a a zoom lens device which is suitable for application to inexpensive cameras.

According to the present invention, such objects can be accomplished by providing a zoom lens device, comprising: a device main body; a front lens group supported by the main body so as to be moveable along an optical center line toward and away from the main body; a rear lens group supported by the main body so as to be moveable along the optical center line toward and away from the main body; and an actuating member which actuates the front lens group and the rear lens group at a prescribed positional relationship between a telephoto end and a wide end so as to achieve a variable composite focal length by the lens groups; the actuating member being adapted to place the front lens group and the rear lens groups at positions suitable for a macro lens function when the actuating member is at a point adjacent to the wide end. More specifically, the positions suitable for a macro lens function are defined substantially separately from normal paths for a zoom action of achieving a variable composite focal length so as to permit focusing on an object at an extremely close range which is substantially closer than objects normal for the zoom lens device.

Thus, the mechanism for the zoom lens function can be conveniently used for the macro lens function so that the mechanism for achieving the two functions can be simplified, and the manufacturing cost can be minimized. This zoom lens device can be applied not only to cameras using photographic film but also to digital cameras, video cameras, telescopes and binoculars.

Typically, a front lens retaining member supports the front lens group in an axially slidable and rotationally fast manner while a rear lens retaining member supports the rear lens group in an axially slidable and rotationally fast manner, and the actuating member comprises a rotatable member, typically consisting of a tube disposed, along with the lens retaining members, coaxially with the optical center line, rotatably supported by the main body and engaging the front lens retaining member and the rear lens retaining member via a cam arrangement for converting a rotational movement of the rotatable member into movement of the lens retaining members at the prescribed positional relationship between the telephoto end and the wide end.

According to a preferred embodiment of the present invention, the cam arrangement comprises radial projections formed in the lens retaining members and cam slots formed in the rotatable member engaging the radial projections, and the positions of the front and rear lens groups suitable for a macro lens function are defined by the cam slots.

If the entire stroke of the lens retaining members is desired to be used for the zoom lens function, at least one of the cam slots may define two paths for a corresponding one of the lens groups in a region adjacent to the wide end, the zoom lens device further comprising a member for selectively guiding the lens group into one of the two paths. Thus, this guide member allows selection between the zoom lens function and the macro lens function.

When the actuating member is powered by an electric motor, the device may further comprise a telephoto switch for powering the motor in a direction to actuate the rotatable member toward the telephoto end, a wide switch for powering the motor in a direction to actuate the rotatable member toward the wide end, a macro button for powering the motor into moving the rotatable member into an angular position for holding the lens groups at the position suitable for the macro mode. To avoid inadvertent selection of the macro lens mode, the device may further comprise a motor control circuit for preventing the rotatable member from stopping at the position suitable for the macro mode once the telephoto switch or the wide switch is activated.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
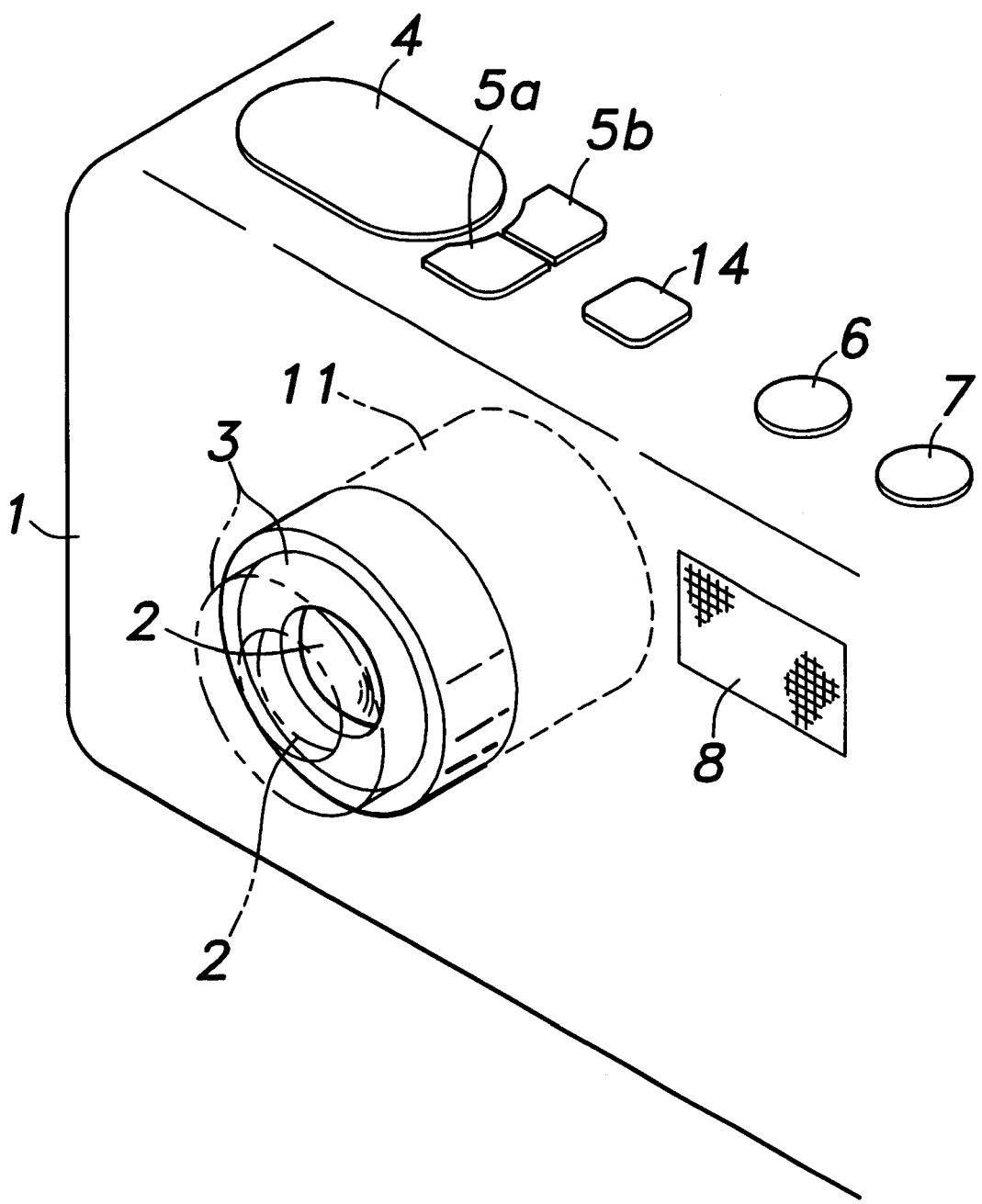
FIG. 1 is a perspective view of a camera embodying the present invention.
Figure 2:
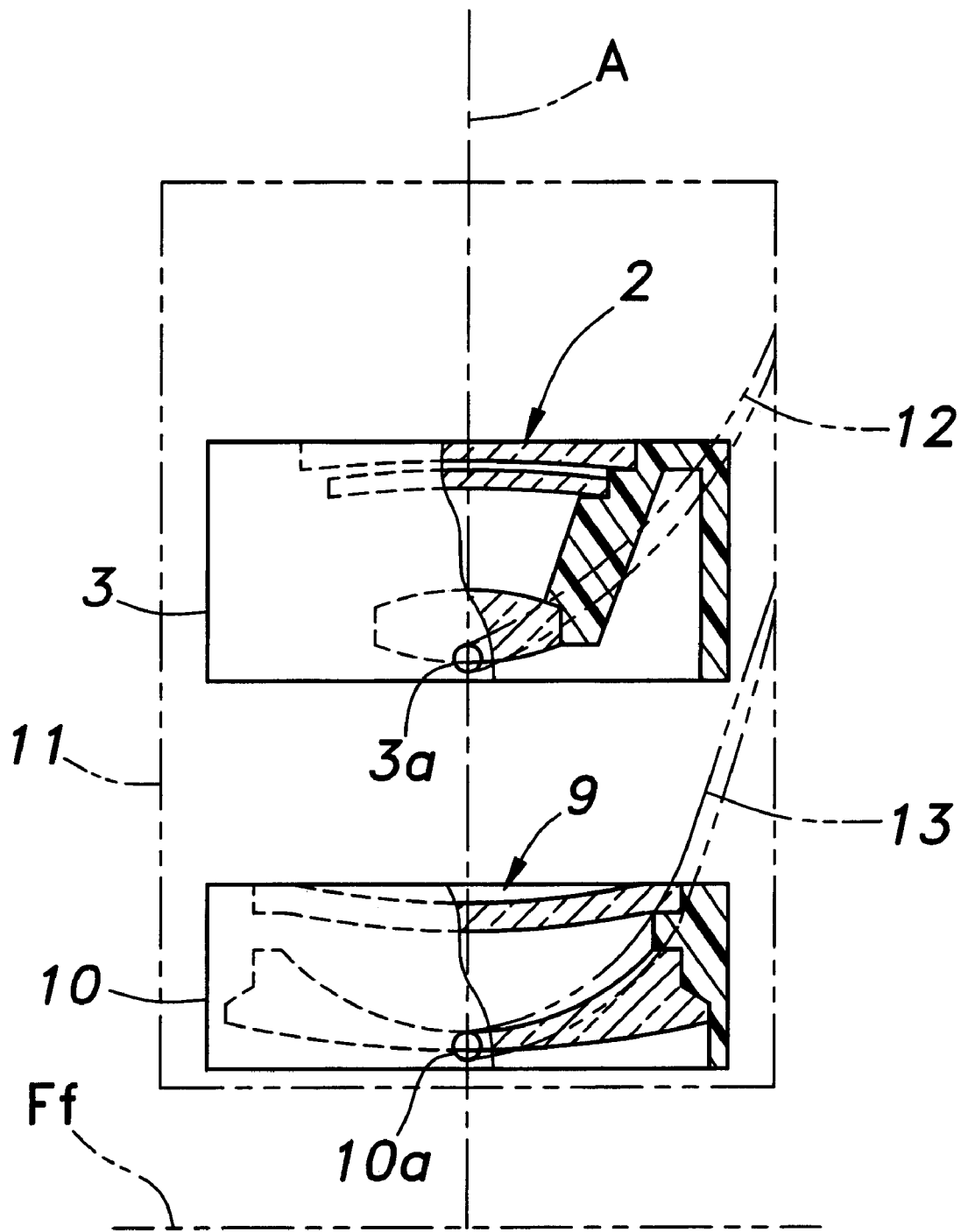
FIG. 2 is a schematic sectional view showing an essential part of the camera shown in FIG. 1.

FIG. 1 is a perspective view of a zoom lens camera for general consumers embodying the present invention. This camera comprises a camera body 1, and a rotatable tube 11 rotatably supported in the camera body 1 and partly projecting from a front face of the camera body. Referring also to FIG. 2, the rotatable tube 11 receives a front lens retaining member 3 and a rear lens retaining member 10 both in an axially slidable and rotationally fast manner by a guide arrangement not shown in the drawing. The front lens retaining member 3 retains a front lens group 2, and the rear lens retaining member 10 retains a rear lens group 9.

The upper face of the camera body 1 is provided with a shutter button 4, a telephoto button 5a for moving the lenses toward the telephoto end, a wide button 5b for moving the lenses toward the wide end, a super macro mode (SM) button 6 for close-up shots, and an ultra super macro mode (USM) button 7 for close-up shots at even closer ranges. These close-up modes are described hereinafter in more detail. The front face of the camera body 1 is provided with a strobe light 8.

As best illustrated in FIG. 2, the front lens group 2 on the side of the photographic object and the rear lens group 9 on the side of the focal plane $F_f$ on the side of the photographic film are coaxially arranged on the optical center line A. The lens retaining members 3 and 10 supporting the front and rear lens groups 2 and 9, respectively, are adapted to be moved along the optical center line A. The lens retaining members 3 and 10 are provided with radial projections 3a and 10a, respectively, on their outer circumferential surfaces. These projections 3a and 10a are received in cam slots 12 and 13 formed in the rotatable tube 11 which is adapted to be turned either manually or by a motor not shown in the drawing.

The cam slots 12 and 13 extend along spiral paths defined around the optical center line A. Therefore, as the rotatable tube 11 is turned, the projections 3a and 10a are actuated by the cam slots 12 and 13, and the front and rear lens groups are moved axially at a prescribed positional relationship as determined by the shapes of the corresponding cam slots 12 and 13 so as to achieve a variable composite focal length as well known in the art of zoom lenses.

Figure 3:
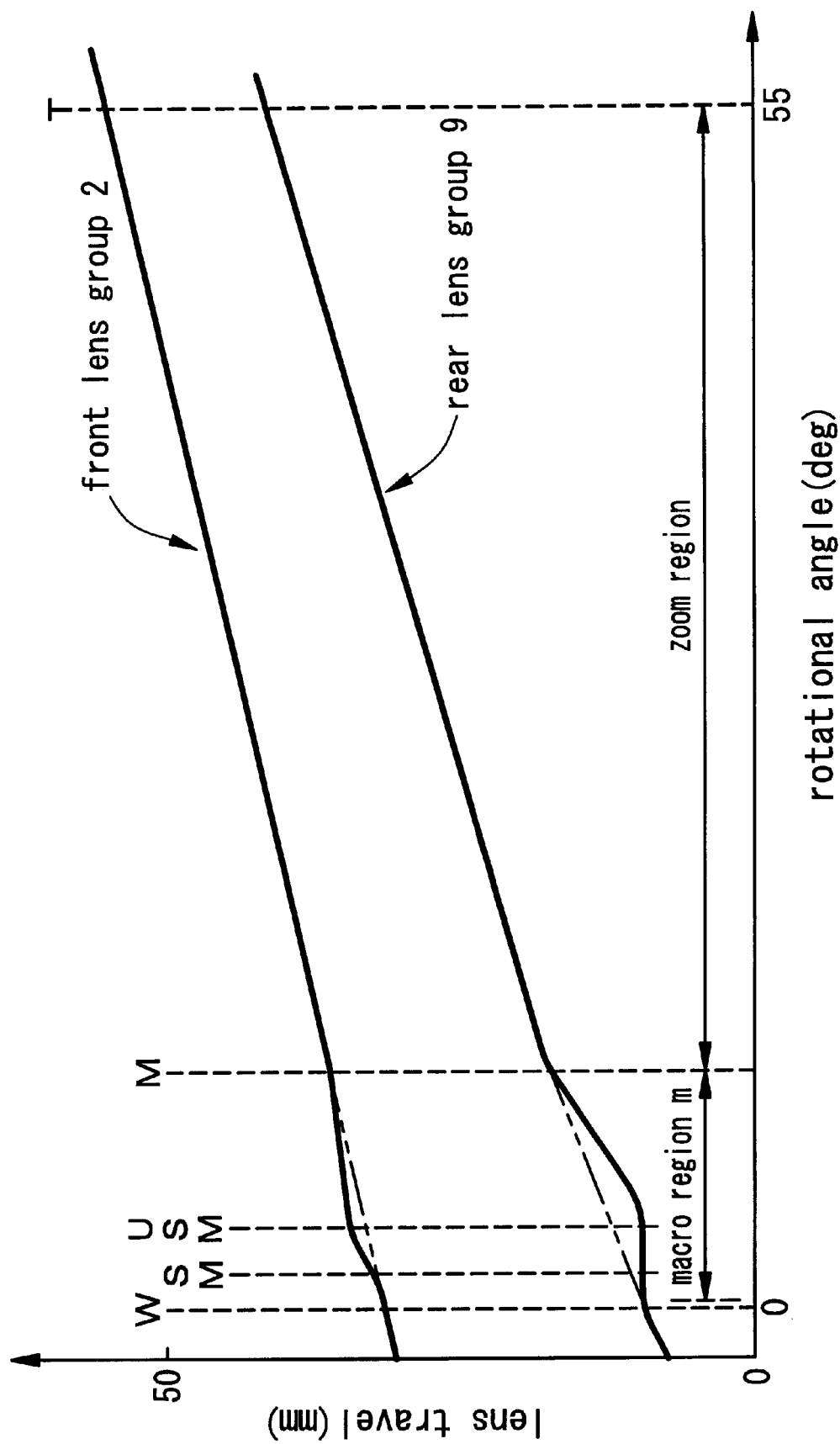
FIG. 3 is a graph showing the travel of the front and rear lens groups in relation to the rotational angle of the rotatable tube according to the first embodiment of the present invention.
Figure 4:
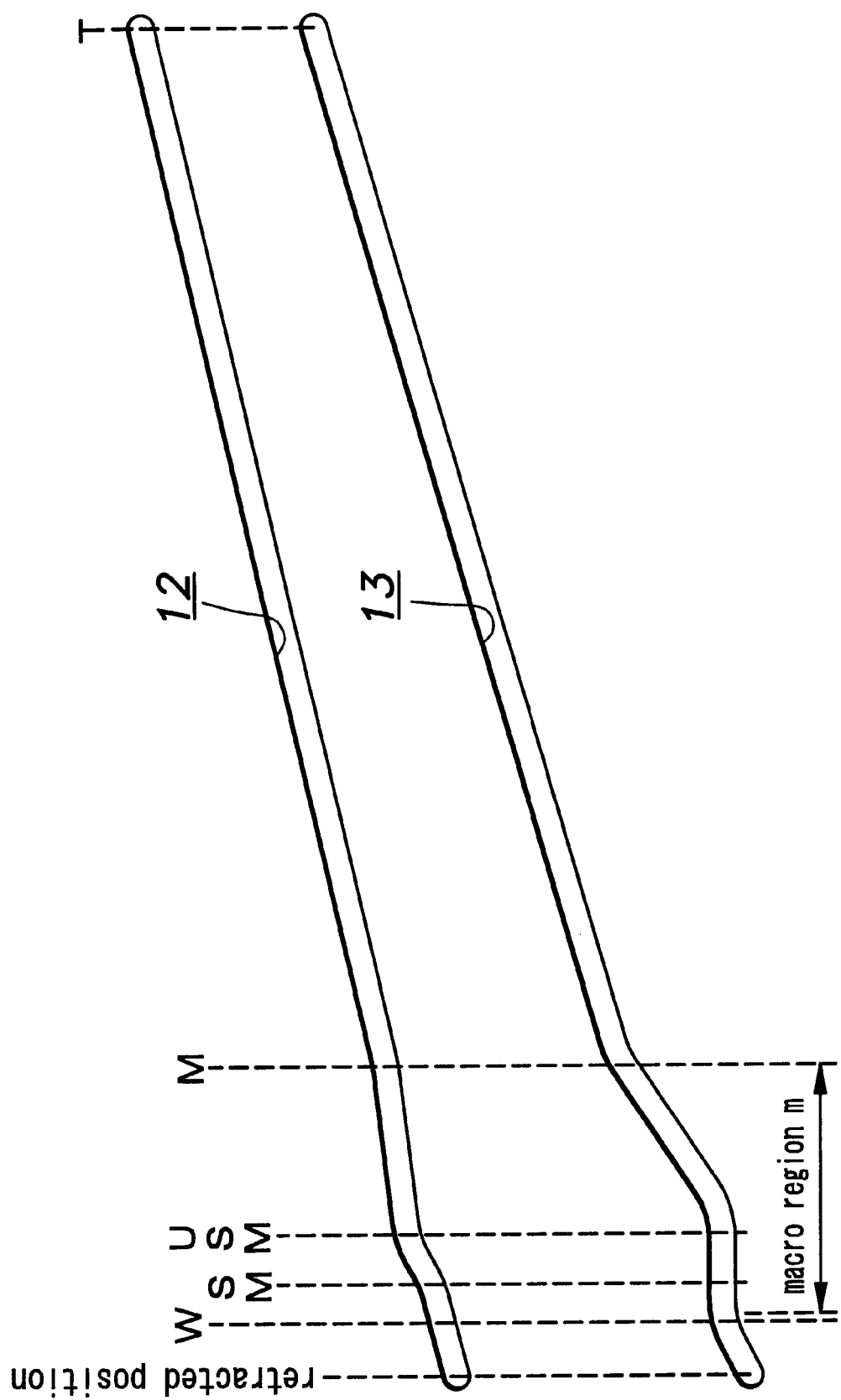
FIG. 4 is a diagram showing the cam slots of the rotatable tube in a developed view.

FIGS. 3 and 4 show the cam slots 12 and 13 in a developed view. In the graph of FIG. 3, the abscissa corresponds to the rotational angle of the rotatable tube 11. The wide end (W) is indicated by angle zero, and the telephoto end (T) is indicated by 55 degrees in angle. The ordinate corresponds to the lens position as measured from the film surface along the optical center line. A transitional point M is defined at a point between the two extreme ends, somewhat closer to the wide end, and a macro region is defined as the region extending from the wide end to the transitional point M. In this embodiment, the transitional point is about 20% of the of the entire zoom range extending between the wide end W and the telephoto end T. The composite focal distance at the wide end is 35 mm, and the composite focal distance at the telephoto end is 70 mm so that the composite focal distance at the transitional point is 42 mm.

It should be noted that the macro region is designed for close-up shots, and is not intended for normal zoom shots. The front and rear lens groups are guided along paths (indicated by solid lines in FIG. 3) for the zoom lens action over a large part of their travel, but deviate from the paths for the zoom lens action in the macro region (indicated by imaginary lines in FIG. 3). When the lens groups reach the wide end, their positions return to points on the paths for the zoom lens action.

In the illustrated embodiment, the rear lens group 9 is kept substantially stationary in a region extending from the wide end to a middle point of the macro region while the advance of the front lens group is accelerated from the wide end to the middle point of the macro region. The middle point is defined as the ultra super macro point (USM), and a middle point between the wide end and the ultra super macro point (USM) is defined as the super macro (SM) point. In other words, a certain region near the wide end of the zoom lens travel is reserved for super macro and ultra super macro close-up shots. The paths of the lens travel between the ultra super macro point and the transitional point M are defined simply for smoothly connecting the paths to those for the zoom lens action.

In this embodiment, the super macro point (SM) is suitable for photographic objects in the distance range of 30 to 80 cm from the front end of the front lens group 2, and the ultra super macro point (USM) is suitable for photographic objects in the distance range of 10 to 30 cm from the front end of the front lens group 2. The camera is provided with a suitable detent arrangement so that the lens groups may be held stationary at the telephoto end, the super macro point, the ultra super macro point, and the transitional point. In other words, as far as the region extending between the wide end and the transitional point is concerned, the lens groups may be allowed to occupy only these discrete points. However, it is desirable for the lens groups to be moved smoothly and continually to any point in the range extending between the telephoto end T and the transitional point M.

The paths for the lens groups extend beyond the wide end, away from the telephoto end, so that the lens groups 2 and 9 or the lens retaining members 3 and 10 may be substantially entirely retracted into the camera body 1. Such a lens position is convenient for carrying the camera while not in use because the lens groups do not project from the outer profile of the camera.

The mode of operation of this camera is described in the following. In this case, the camera is incorporated with a motor and a motor control circuit which is adapted for the action of the motor as described hereinafter. When the normal zoom action of the camera is intended with the lens groups located at the wide end, the user presses the telephoto button 5a, and the lens groups continue to travel toward the telephoto end as long as the user keeps pressing the telephoto button 5a. A suitable interlock circuit is incorporated in the motor control circuit so that the lens groups would advance at least to the transitional point once the telephoto button is pressed at the wide end no matter for how short a time period the telephoto button is pressed. When the lens groups are located in the region extending between the transitional point and the telephoto end, the camera operates much in the same way as a conventional zoom lens camera. In other words, the zoom lens function can provide any arbitrary composite focal length between 47 mm and 70 mm. Once the lens groups are moved from this region beyond the transitional point (M), the lens groups continue to move to the wide end without stopping at any intermediate point even when the wide button is released. Thus, when the zoom lens action of the camera is employed, the super macro mode and the ultra super macro mode are avoided from being inadvertently selected.

When close-up shots are desired, the user presses either the super macro button 6 or the ultra super macro button 7 depending on the distance to the photographic object. This causes the lens groups to move to the super macro position or the ultra super macro position as the case may be. When the lens groups are at the super macro position which is suitable for achieving a proper focusing for photographic objects in the distance range of 80 to 30 cm, the lens stop is sharply reduced (to F32, for instance) from the normal setting, and the strobe light is placed ready for activation at the same time. The reduced lens stop provides a large focal depth, and the resulting reduction in the exposure is compensated by the forced activation of the strobe light. Thus, the focal setting of the lens groups, combined with the reduced lens stop and the activation of the strobe light, allows objects in the near range to be photographed in a proper manner. When the lens groups are at the ultra super macro position which is suitable for achieving a proper focusing for photographic objects in the distance range of 30 to 10 cm, the lens stop is even more sharply reduced (to F44, for instance) from the normal setting, and the strobe light is again placed ready for activation at the same time. The reduced lens stop provides a large focal depth, and the resulting reduction in the exposure is compensated by the forced activation of the strobe light. Thus, the focal setting of the lens groups, combined with the reduced lens stop and the activation of the strobe light, allows objects in the extremely near range to be photographed in a proper manner.

As discussed earlier, the macro positions (SM and USM) for the rear lens group are not different from the position at the wide end. The front lens group is however moved forward by about 1 mm from the wide end for the super macro position (in the case where the focal length of the lens set is 35 mm at the wide end, for instance), and by about 3 mm from the wide end for the ultra super macro position.

According to this arrangement, the macro modes can be achieved by making use of a part of the arrangement for the zoom action of the lens set, and this contributes to the simplification of the camera structure, and the manufacturing cost. Also, the user is not in any way inconvenienced by such a combination, in particular when the measure for avoiding inadvertent selection of the macro modes during the zoom lens operation is taken as discussed above.

In the illustrated embodiment, a forced aperture stop release button 14 is placed on the camera body as shown in FIG. 1 so that the reduced lens stop and the forced activation of the strobe light may be canceled while the automatic exposure control is activated. This provides an additional option for macro photography. For instance, it is possible to avoid the background becoming excessively dark by highly reducing the aperture stop.

Figure 5:
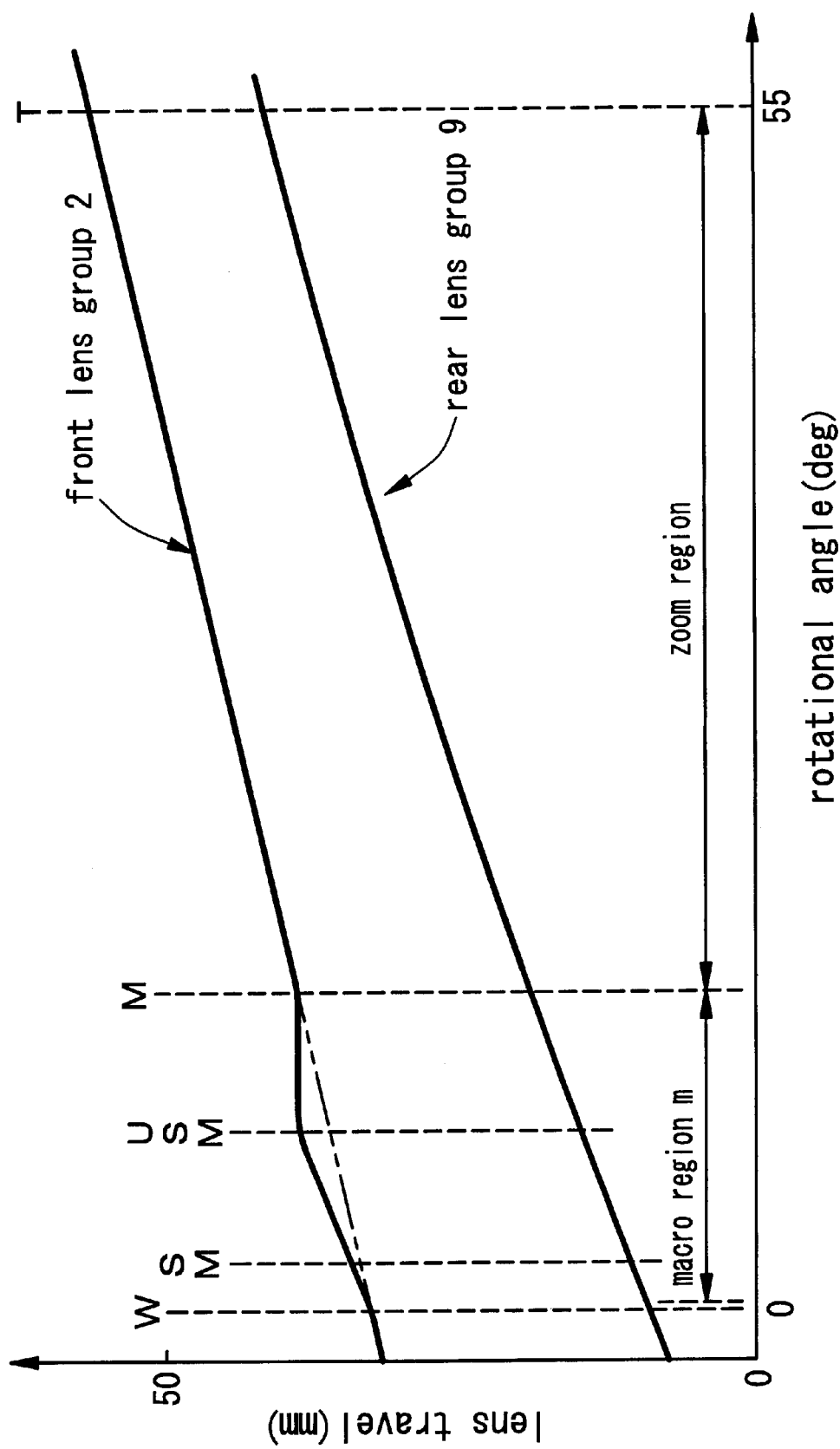
FIG. 5 is a view similar to FIG. 3 showing the second embodiment of the present invention.
Figure 6:
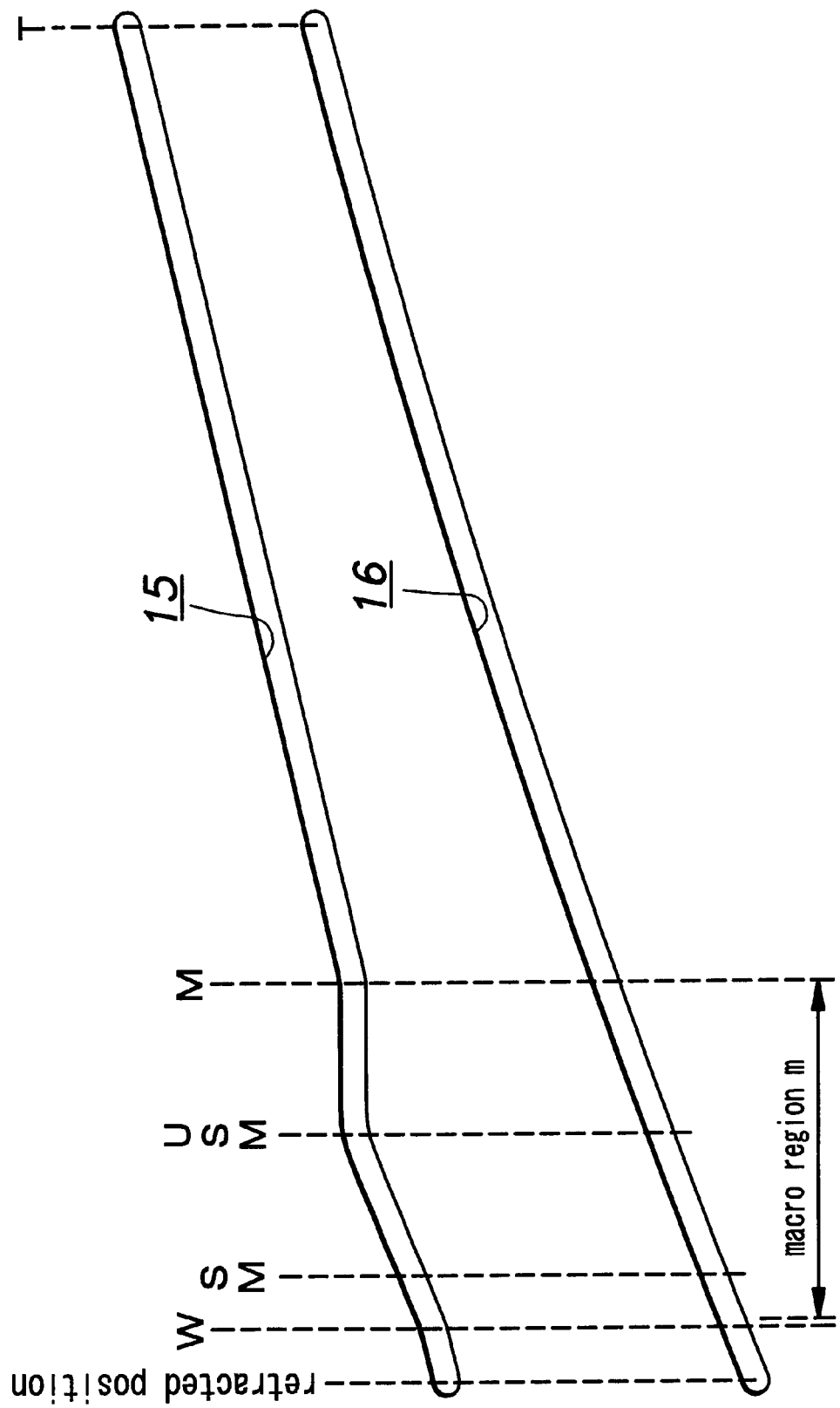
FIG. 6 is a view similar to FIG. 4 showing the second embodiment of the present invention.

FIGS. 5 and 6 show a second embodiment of the present invention in which the rear lens group is allowed to move along the path for the zoom lens action throughout the macro region m. The focal adjustment required for the super macro and ultra super macro modes is accomplished only by the appropriate movement of the front lens group away from the path for the zoom lens action. In this case, because only the front lens group is required to deviate from the path for the normal zoom lens action, the arrangement for the lens movement can be simplified, and an accurate positioning of the lens groups is possible. As shown in FIG. 6, only the cam slot 15 for the front lens group is required to be changed from the spiral path (the straight path in the developed view), and the modification from the conventional arrangement for the zoom lens action is minimized.

As a person skilled in the art can readily appreciate, the movement of the front and rear lens groups is not limited by the above described embodiments. For instance, it is also possible to eliminate or substantially reduce the deviation of the movement of the front lens group from the path for the normal zoom action, and allow only the rear lens group to deviate from the normal zoom action.

The inventor of this application has discovered that a region near the wide end is rarely used by a cameraman using an inexpensive zoom lens camera, and reserving a part of the range for the zoom lens action for macro shots does not cause any significant inconvenience for the use of the zoom lens action. Based on this recognition, the present invention proposes to divert a part of the original range for the zoom lens action for macro modes.

Figure 7:
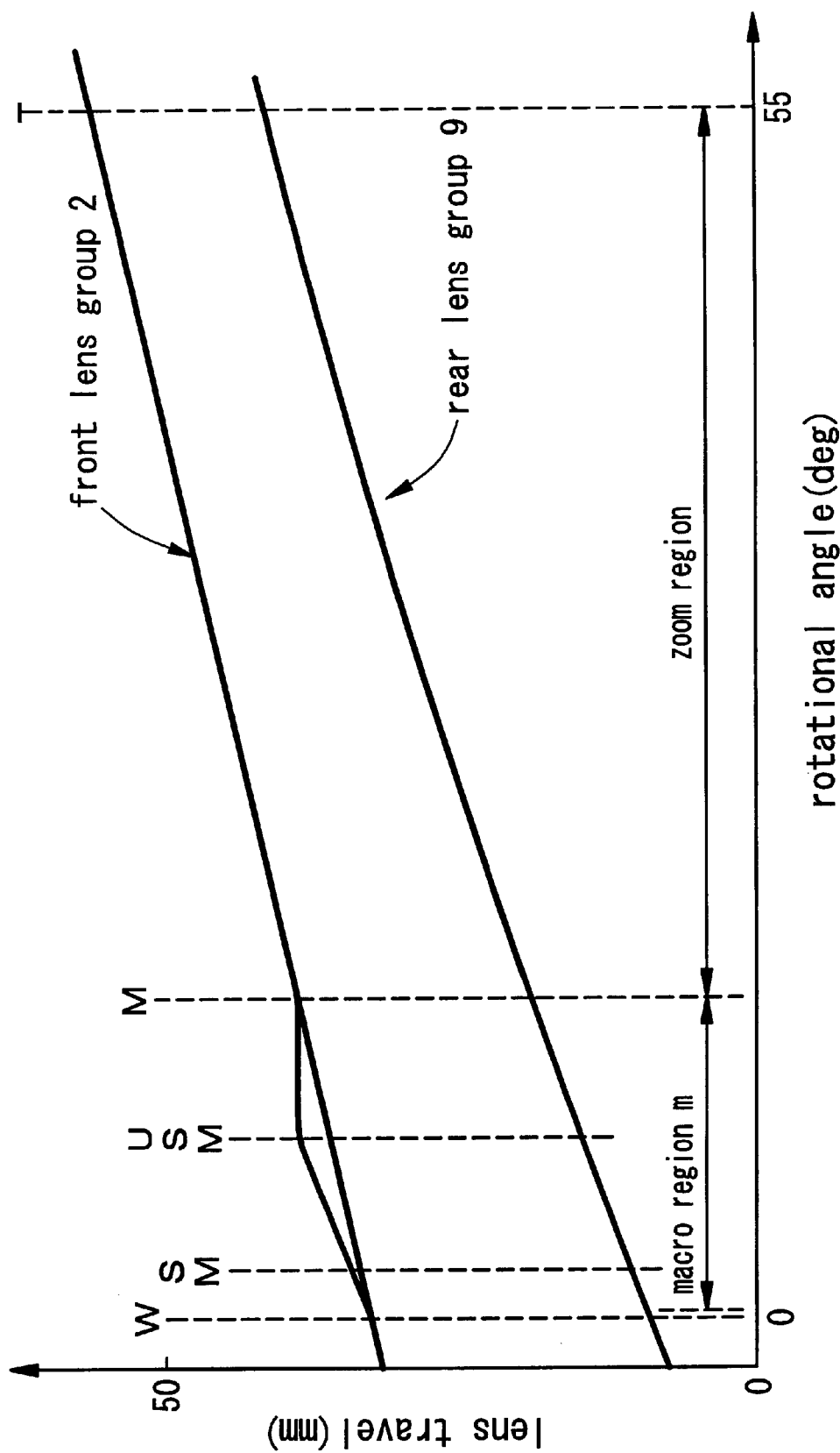
FIG. 7 is a view similar to FIG. 3 showing the third embodiment of the present invention.
Figure 8:
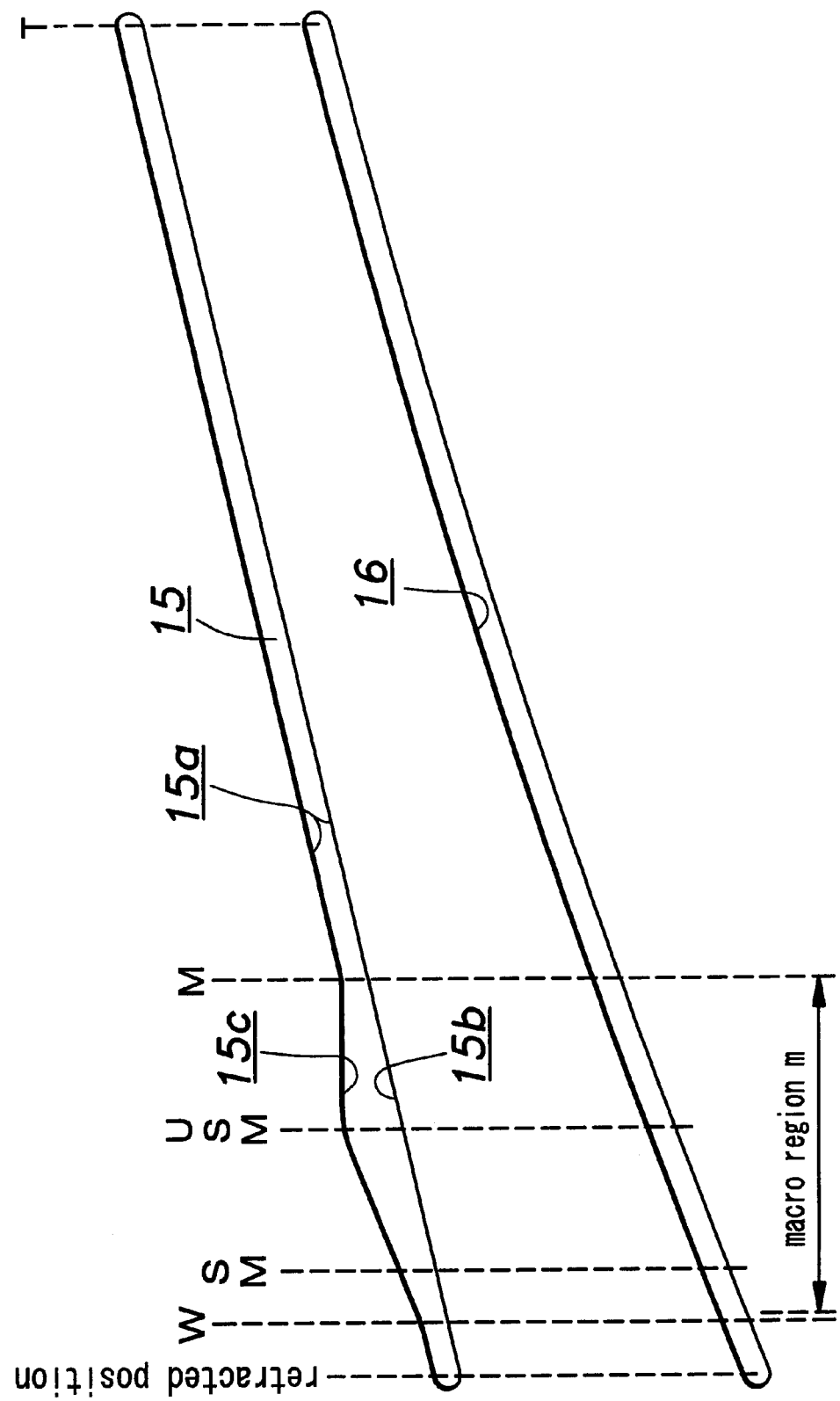
FIG. 8 is a view similar to FIG. 4 showing the third embodiment of the present invention.

FIGS. 7 to 10 show a third embodiment of the present invention in which the entire range of movement of the lens groups is available for the zoom lens action while allowing the lens groups to be properly positioned for the super macro and ultra super macro mode. FIG. 7 shows the trajectories of the front and rear lens groups for this embodiment. The trajectory for the rear lens group 9 is not different from that of the rear lens group for the zoom lens function whereas the trajectory for the front lens group 2 in the range for the macro modes is bifurcated and includes a first part deviating from the path for the zoom lens function and a second part not deviating from the path for the zoom lens function. In this case, the rear lens group 9 follows a rectilinear path in the developed view. As far as the first part of the trajectory of the front lens group 2 is concerned, the movement of the front lens is somewhat accelerated in the range between the wide end W and the ultra super macro point USM, and remains substantially stationary in the range between the ultra super macro point USM and the transitional point M.

Such a movement of the front lens group can be accomplished by suitably increasing the width of the cam slot for the front lens group 2 in the range for the macro modes, and guiding the radial projection 3a for the front lens group with one of the edges 15c of the cam slot for the macro modes and with the other of the edges 15b of the cam slot for the continued zoom lens function. In the remaining parts of the cam slot 15, the radial projection 3a is guided by the both edges 15a of the cam slot 15.

Figure 9:
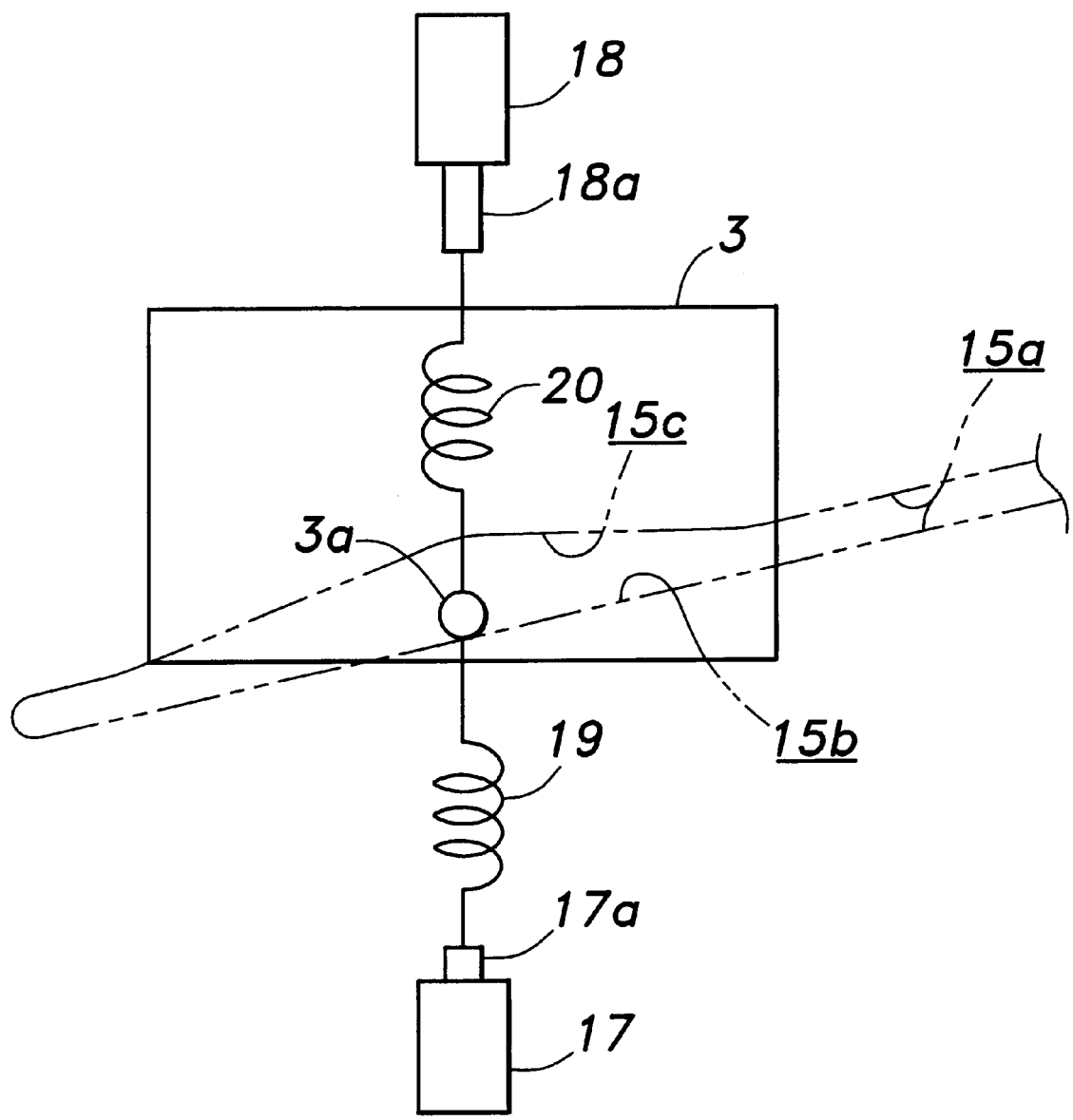
FIGS. 9 and 10 are diagrams showing the guide mechanism for selecting the macro lens function or the zoom lens function in the macro region.

Referring to FIG. 9, a pair of solenoid devices 17 and 18 are arranged on either side of the projection 3a, and plungers 17a and 18a of these solenoid devices 17 and 18 engage the projection 3a via corresponding tension springs 19 and 20 so that the projection 3a can be resiliently urged onto one of the edges 15b and 15c of the cam slot 15 depending on which of the solenoid devices 17 and 18 is energized. For this purpose, the camera is provided with a control circuit for energizing the two solenoids in mutually exclusive manner depending on the selection of the zoom lens function or the macro mode.

When the zoom lens function is selected by pushing either the telephoto button 5a or the wide button 5b, one of the solenoids 17 is energized, and the projection 3a is guided along one of the edges 15b defining the path for the normal zoom lens function as the rotatable tube 11 is turned. When the macro mode is selected by pushing either the super macro button or the super macro button, the rotatable tube 11 rotates to a prescribed angle which corresponds to the super macro point or the ultra super macro point as the case may be and the projection is resiliently urged against the other edge 15c of the cam slot 15. In either case, the tension coil springs 19 and 20 accommodate the movement of the projection 3a in the axial direction dictated by the configuration of the cam slot 15.

Figure 10:
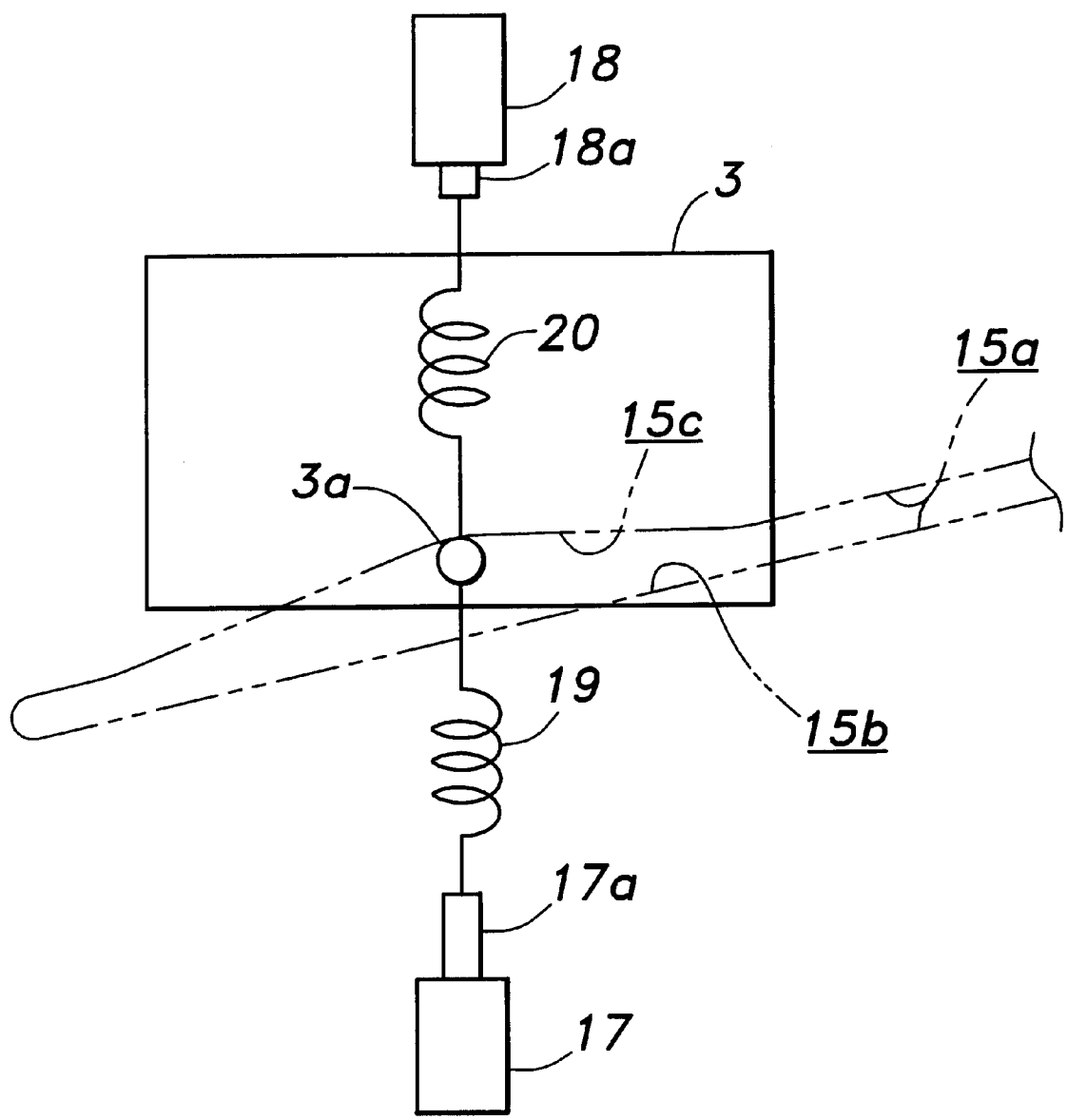

The structure illustrated in FIGS. 9 and 10 is only exemplary, and can be substituted by other possible arrangements. The illustrated embodiment used two solenoids to actuate the projection 3a in the corresponding directions, but one of the solenoids may be omitted if the spring force of the corresponding tension coil spring is made more dominant than the other tension coil spring so that the dominant tension coil spring may urge the projection onto one of the edges and the single solenoid urges the projection onto the other edge via the less dominant spring against the spring force of the dominant tension coil spring in a selective manner.

Similarly as the previous embodiments, the deviation from the path for the normal zoom lens function may occur in only one of the cam slots or in both the cam slots, and the configuration of the cam slots may be modified from that shown in FIGS. 9 and 10 in corresponding manners as can be readily appreciated by a person skilled in the art.

Figure 11:
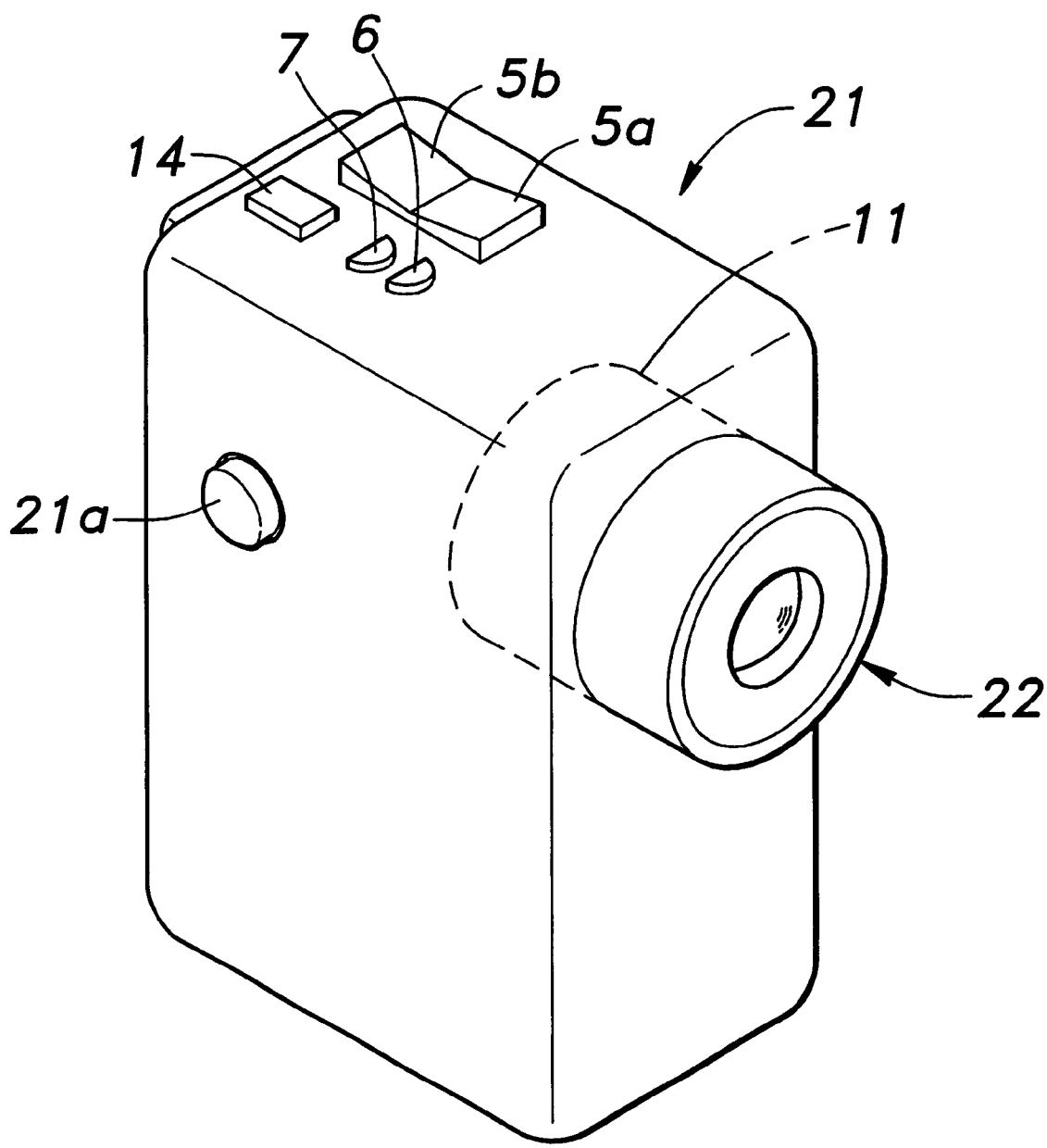
FIG. 11 is a perspective view of a video camera to which the present invention is applied.

The present invention is not limited to film cameras, but may also be applied to digital cameras and video cameras. When appropriately adapted, the present invention may be even applied to telescopes and binoculars. FIG. 11 illustrates a video camera 21 to which the present invention is applied. The parts corresponding to those of the previous embodiments are denoted with like numerals, and description of such parts may be omitted in the following disclosure. In this embodiment also, the zoom lens function is provided simply by pressing either the telephoto button 5a or the wide button 5b while pressing a record button 21a. When the super macro 6 or ultra super macro button 7 is pressed, the rotatable tube 11 turns to an angular position for the super macro or ultra super macro mode as the case may be. Thus, the mechanism for the zoom lens function is favorably used for the macro modes, and the mechanism for achieving the zoom lens function and the macro modes can be simplified.

Although the present invention has been described in terms of preferred embodiments thereof, it is obvious to a person skilled in the art that various alterations and modifications are possible without departing from the scope of the present invention which is set forth in the appended claims.

What is claimed is:

1. A zoom lens device, comprising:
   a device main body;
   a front lens group supported by said main body so as to be moveable along an optical center line toward and away from said main body;
   a rear lens group supported by said main body so as to be moveable along said optical center line toward and away from said main body; and
   an actuating member which actuates said front lens group and said rear lens group at a prescribed positional relationship between a telephoto end and a wide end so as to achieve a variable composite focal length by said lens groups;
   said actuating member being adapted to place said front lens group and said rear lens group at positions suitable for a macro lens function when said front lens group and said rear end group are at a point adjacent to said wide end between said telephoto end and wide end,
   wherein the zoom lens device further comprises a front lens retaining member supporting said front lens group in an axially slidable and rotationally fast manner; and
   a rear lens retaining member supporting said rear lens group in an axially slidable and rotationally fast manner,
   said actuating member comprising a rotatable member rotatably supported by said main body and engaging said front lens retaining member and said rear lens retaining member via a cam arrangement for converting a rotational movement of said rotatable member into movement of said lens retaining members at said prescribed positional relationship between said telephoto end and said wide end,
   and wherein said cam arrangement comprises radial projections formed in said lens retaining members and cam slots formed in said rotatable member engaging said radial projections, said positions of said front and rear lens groups suitable for a macro lens function being defined by said cam slots.

2. A zoom lens device according to claim 1, wherein said positions suitable for a macro lens function are defined substantially separately from normal paths for a zoom action of achieving a variable composite focal length so as to permit focusing on an object at an extremely close range which is substantially closer than objects normal for said zoom lens device.

3. A zoom lens device according to claim 1, wherein said device main body comprises a camera main body using photographic film.

4. A zoom lens device according to claim 1, wherein said device main body comprises a digital camera main body.

5. A zoom lens device according to claim 1, wherein said device main body comprises a video camera main body.

6. A zoom lens device according to claim 1, wherein said cam slots define two sets of positions of said front and rear lens groups for a super macro mode and an ultra super macro mode.

7. A zoom lens device according to claim 1, wherein said lens groups are adapted to be moved beyond said wide end for selectively retracting said lens retaining members substantially into said main body.

8. A zoom lens device according to claim 1, further comprising a motor for actuating said rotatable member, a telephoto switch for powering said motor in a direction to actuate said rotatable member toward said telephoto end, a wide switch for powering said motor in a direction to actuate said rotatable member toward said wide end, a macro button for powering said motor into moving said rotatable member into an angular position for holding said lens groups at said position suitable for said macro mode.

9. A zoom lens device according to claim 8, further comprising a motor control circuit for preventing said rotatable member from stopping at said position suitable for said macro mode once said telephoto switch or said wide switch is activated.

10. A zoom lens device, comprising:

a device main body;

a front lens group supported by said main body so as to be moveable along an optical center line toward and away from said main body;

a rear lens group supported by said main body so as to be moveable along said optical center line toward and away from said main body;

an actuating member which actuates said front lens group and said rear lens group at a prescribed positional relationship between a telephoto end and a wide end so as to achieve a variable composite focal length by said lens groups, said actuating member being adapted to place said front lens group and said rear lens group at positions suitable for a macro lens function when said front lens group and said rear end group are at a point adjacent to said wide end;

a front lens retaining member supporting said front lens group in an axially slidable and rotationally fast manner; and a rear lens retaining member supporting said rear lens group in an axially slidable and rotationally fast manner, wherein said actuating member comprises a rotatable member rotatably supported by said main body and engaging said front lens retaining member and said rear lens retaining member via a cam arrangement for converting a rotational movement of said rotatable member into movement of said lens retaining members at said prescribed positional relationship between said telephoto end and said wide end, said cam arrangement comprising radial projections formed in said lens retaining members and cam slots formed in said rotatable member engaging said radial projections; and wherein at least one of said cam slots define two paths for a corresponding one of said lens groups in a region adjacent to said wide end, said zoom lens device further comprising a guide mechanism for selectively guiding said lens group into one of said two paths.

* * * * *